W. MORRISON.
ELECTRIC BATTERY.
APPLICATION FILED AUG. 11, 1902.
1,006,494.
Patented Oct. 24, 1911.
2 SHEETS—SHEET 1.
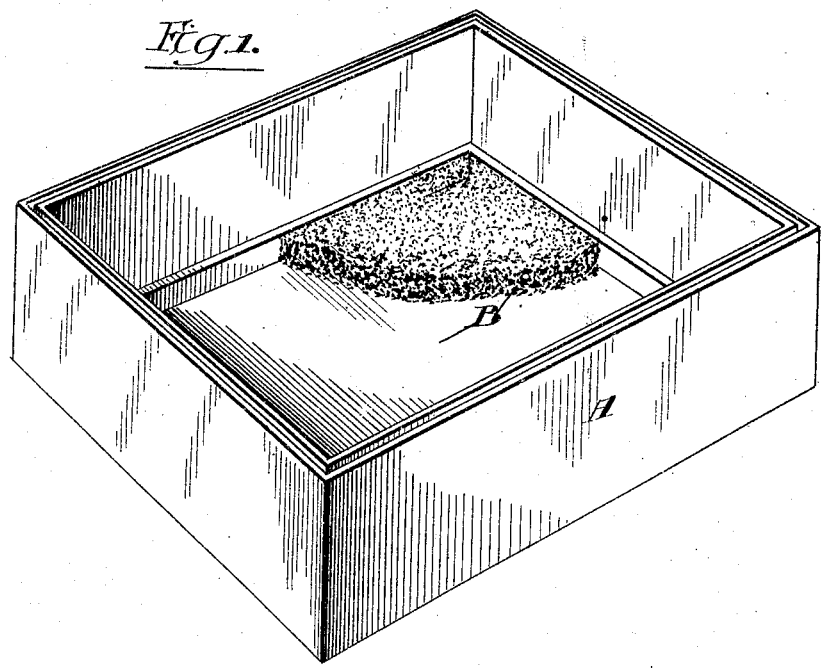
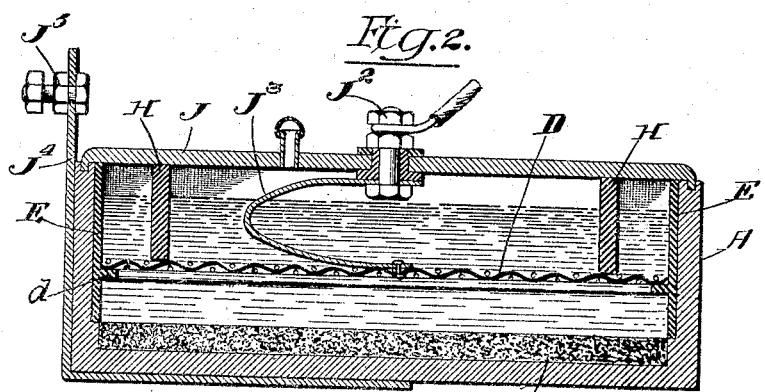
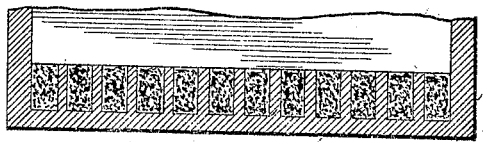
Witnesses:—
Inventor:—
William Morrison
By Chas. C. Bucker
Atty.

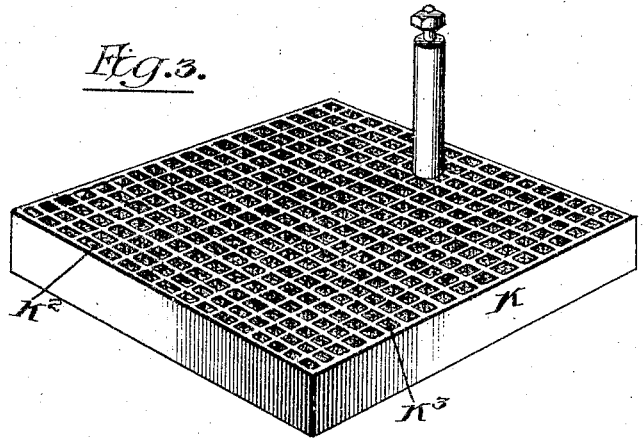
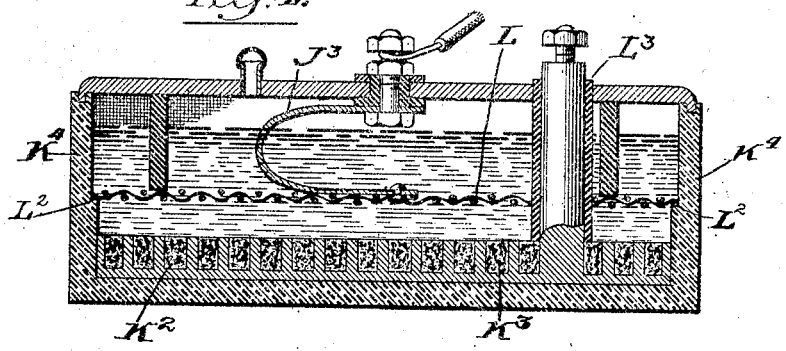
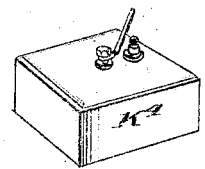

UNITED STATES PATENT OFFICE.

WILLIAM MORRISON, OF CHICAGO, ILLINOIS.

ELECTRIC BATTERY.

1,006,494.　　　　　Specification of Letters Patent.　　Patented Oct. 24, 1911.

Application filed August 11, 1902. Serial No. 119,203.

*To all whom it may concern:*

Be it known that I, WILLIAM MORRISON, a citizen of the United States of America, and resident of Chicago, Cook county, Illinois, have invented a certain new and useful Improvement in Electric Batteries, of which the following is a specification.

My invention relates to an improvement in an electric battery which employs or utilizes bromin electrodeposited or placed upon the negative element disposed at, in or near the bottom of the cell so that the high specific gravity of the bromin tends to cause it to remain upon the negative element. I have described and claimed this invention in another application filed by me concurrently herewith, No. 119,205, and hereinafter referred to, and which application is confined to said bromin gravity cell. In still another application filed concurrently herewith, No. 119,201, and hereinafter referred to, I have described and claimed a means for holding the bromin more stable upon the negative element consisting in a multiplicity or plurality of pockets formed or made in the negative element. In the present application I desire to illustrate, describe and claim still other means for holding the bromin still more stable in or upon the negative element.

In carrying out my invention and to produce a cell in which the bromin is held still more stable upon or in the negative element, which bromin in its free state is in the form of a liquid, I provide a containing cell and place within it a suitable conductor and upon or in this suitable conductor I place a bed of suitable porous material, such as granular carbon for instance, which conductor and the porous bed constitute the negative element, said negative element being so disposed that gravity tends to cause the bromin to remain in contact with the negative element. The liquid bromin which is electrodeposited or placed upon or within the porous bed, percolates and penetrates into and throughout the interior of the porous bed, thus obtaining an increased area of surface contact between the negative element and the bromin, and also serving to confine and hold the bromin uniformly distributed upon and throughout the negative element. By this means the bromin is more securely held within or by the negative element and is to a great extent prevented from being removed by the wash of the liquid electrolyte above it. To still more uniformly and stably hold the liquid bromin I may employ a multiplicity or plurality of recesses or pockets formed in or upon the negative element and then fill them with granular carbon thus providing a negative element made up of a multiplicity of pockets and having a porous filling providing a porous bed.

Reference may now be had to the accompanying drawings, in which:

Figure 1, is a perspective view of the interior of a containing cell showing a portion of the porous bed disposed in the bottom of the cell. Fig. 2, is a central cross section through a completed cell. Fig. 3, is a perspective view of a negative element removed from the interior of the cell and showing the multiplicity of pockets or recesses and the porous bed showing a modification. Fig. 4, is a central cross section view of a completed cell, showing a removable negative element made up or formed of a multiplicity of pockets and the porous bed. Fig. 5, is an exterior perspective view of a completed cell. Fig. 6, is a detail sectional view showing a carbon cell, the pockets and the porous bed, as shown in Fig. 3, of a modified form.

In Figs. 1 and 2 I have shown a cell made of carbon, which cell I have described and claimed in an application filed concurrently herewith, and which cell is designated at A. Within the cell and upon the conductor bottom thereof I place a mass of granular material, preferably carbon, which provides a porous bed of conducting material, and which, with the conducting bottom of the cell, constitutes the negative element B. Above this negative element is a positive element D made from copper wire gauze, or other suitable reticulated material, which is supported at its edges and at all of its sides, by resting upon the rib $d$, extended from an insulating band E, which extends about the interior of the cell. This insulating band isolates the interior sides of the carbon cell from the bromin, and prevents an accumulation of that material at the sides or edges of the negative element, for it is evident that if the bromin was electrodeposited upon the carbon sides of the cell it would run down upon the negative element and accumulate at the edges thereof. As described in the application for the gravity bromin cell, and in the other applications, when the bromids of a metal are used and the metal is electrodeposited upon the positive element, this insulating band also prevents too great an accumulation of the electrodeposited metal upon or about the edges of the positive element. The positive element D, is held in place upon the annular projecting rib $d$ by the spacing strips H, which when the cover J, is in place, bear upon the top of the positive element. The terminal $J^2$ is connected by conductor strip $J^3$ with the positive element and as in this case the cell is of carbon and therefore itself a conductor the conductor strip $J^4$ may be secured to the exterior of the cell and connected with the other terminal of the battery $J^5$.

In Figs. 3 and 4 I have shown a suitable conductor K having a multiplicity of pockets $K^2$ or recesses within which, preferably, I place granular carbon to provide a negative element consisting of the conductor and a porous bed $K^3$ held within and by the pockets. In this instance I have shown a containing cell $K^4$ made of glass, within which is disposed at the bottom thereof the negative element which, in this instance, is removable from the interior of the containing cell. The positive element L as shown is in this case supported by an offset $L^2$ formed in the sides of the non-conducting cell and the negative element is provided with a conducting terminal $L^3$ leading to the exterior of the cell. In this form of construction also the other terminal of the battery is connected with the positive element by means of the conductor strip $J^3$. In this type of cell, as the material of which it is composed is itself a non-conductor, the insulating band used in connection with the carbon cell is unnecessary.

I have thus shown and described the application of the porous bed in connection with a carbon cell without pockets in Figs. 1 and 2 and I have also shown in Figs. 3 and 4 the porous bed within pockets in connection with a glass cell. It is evident that the porous bed without pockets of Figs. 1 and 2 in connection with the carbon cell may also be employed with pockets in connection with the carbon cell as shown in Fig. 6. And it is also evident that if desired the porous bed without pockets may be employed in connection with the non-conducting cell of Figs. 3 and 4.

To more firmly and securely hold the liquid bromin within and throughout the porous bed I may treat the material composing the bed with a suitable solution of silicate of soda and the moment this comes in contact with the soluble bromid or bromin, bromid of soda and silicic acid or silicon oxid are formed in a gelatinous mass.

The serial numbers of my co-pending applications are as follows: 119,201, 119,202, 119,204, and 119,205.

It will be understood that the positive element D can be made of any suitable metal.

What I claim as my invention is:

1. In a bromin gravity electric battery, a negative element having a mass of granular porous material providing a porous bed, and bromin in its free state within the said porous bed.

2. In an electric gravity bromin battery, a negative element, in or at the bottom of a containing cell, consisting of a multiplicity or plurality of pockets or recesses, and a granular porous filling in said pockets providing a porous mass and bromin in its free state within the porous mass.

3. In a bromin gravity electric battery, a negative element having a mass of granular porous material providing a porous bed, which said negative element is located at or near the bottom of a containing cell, bromin in its free state within the said porous bed and a positive element above the negative element together with a suitable electrolyte.

4. In an electric gravity bromin battery, a negative element at or near the bottom of a containing cell consisting of a multiplicity or plurality of pockets or recesses, a granular porous filling in said pockets providing a porous mass and bromin in its free state within the porous mass together with a positive element above the negative element and a suitable electrolyte.

5. In a gravity bromin battery, a cell made of conducting material and a bed of granular carbon in the bottom of said cell and bromin in its free state within said porous mass.

6. In an electric gravity bromin battery, a containing cell made of conducting material, pockets or recesses in the bottom of said cell and granular porous material within said pockets or recesses and bromin in its free state within said porous mass and pockets.

Signed by me at Chicago, Cook county, Illinois, this 8th day of August, 1902.

WILLIAM MORRISON.

Witnesses:
CHAS. C. BULKLEY,
HARRY P. BAUMGARTNER.